United States Patent [19]
Kane et al.

[11] 3,852,556
[45] Dec. 3, 1974

[54] COMBINATION HAND-JACK, SEMAPHORE AND TRAVEL INDICATOR FOR HIGH-VOLTAGE CIRCUIT INTERRUPTER

[75] Inventors: Richard E. Kane, Monroeville; William H. Fischer, Penn Hills, both of Pa.

[73] Assignee: Westinghouse Electric Corporation, Pittsburgh, Pa.

[22] Filed: Dec. 31, 1969

[21] Appl. No.: 889,635

[52] U.S. Cl. ............... 200/310, 250/229, 335/17, 340/366
[51] Int. Cl. ............................................ H01h 9/16
[58] Field of Search ............ 200/167; 250/231, 229; 335/17; 340/256, 366

[56] References Cited
UNITED STATES PATENTS

| | | | |
|---|---|---|---|
| 2,543,522 | 2/1951 | Cohen | 250/231 X |
| 2,912,858 | 11/1959 | Fuller | 250/231 X |
| 3,083,359 | 3/1963 | Smith | 335/17 X |
| 3,121,795 | 2/1964 | Marvin | 250/231 X |
| 3,225,170 | 12/1965 | Chabala et al. | 200/167 |

Primary Examiner—R. N. Envall, Jr.
Attorney, Agent, or Firm—W. R. Crout

[57] ABSTRACT

An indicator rod is secured to the movable contact structure of a high-voltage circuit interrupter, and extends upwardly within an interrupting column structure. For indicating the open and closed-circuit positions of the interrupter, a semaphore is secured to the upper end of the indicator rod, and is visible through a transparent cover. A manually operable hand-jack may, at times, be threadedly secured to the aforesaid indicator rod, and will permit a slow opening and closing operation of the interrupter for maintenance purposes. In addition, the aforesaid indicator rod may serve as a travel indicator by the utilization of a solar cell attached to the inside of the transparent cover, and by utilizing a light source attached to the cover flange. The semaphore indicator casts a shadow on the solar cell as it moves to the open position thereby reducing the light striking the solar cell.

Consequently, the aforesaid indicator rod may be used for three functions, namely as a semaphore, hand-jack maintenance device, and also as a travel indicator for determining the velocity of opening and closing travel.

4 Claims, 16 Drawing Figures

COMBINATION HAND-JACK, SEMAPHORE AND TRAVEL INDICATOR FOR HIGH-VOLTAGE CIRCUIT INTERRUPTER

CROSS-REFERENCES TO RELATED APPLICATIONS

Reference may be had to U.S. patent application filed Dec. 9, 1968, Ser. No. 782,365, now U.S. Pat. No. 3,596,028 by Richard E. Kane and Frank L. Reese describing the general operation of the circuit breaker under consideration. Also U.S. patent application filed Sept. 25, 1968, Ser. No. 762,479, now U.S. Pat. No. 3,590,189 by William H. Fischer and Wayne S. Aspey describes circuit-breaker structure pertinent to the present application.

BACKGROUND OF THE INVENTION

As is well known by those skilled in the art, it is very necessary in the operation of circuit breaker structures to enable one to positively determine whether the breaker is in the open or in the closed-circuit position. With many breaker constructions, there is provided a flag, or semaphore, which is fixedly secured to a bellcrank or other operating part, which is associated with the movable operating mechanism of the device. Consequently, in the two positions of the breaker, the aforesaid flag or semaphore will positively indicate the open and closed-circuit positions of the interrupter. Obviously, when maintenance is desired to be performed upon a breaker, it is necessary to positively determine, for safety reasons, whether the breaker is in the open-circuit position. Additionally, when disconnecting switches are in series with the breaker, as is the general custom, it is not possible to open the air-break disconnecting switches unless assurance is had that the series circuit breaker is in the open position. As a result, indication of the breaker open and closed positions is an absolute necessity.

In the aforesaid patent application now U.S. Pat. No. 3,596,028 there is illustrated and described a high-voltage compressed-gas circuit interrupter. This interrupter construction is adaptable for a wide variety of voltage and current ratings. It may be necessary during maintenance operations to be able to manually effect the relatively slow opening and closing operations of the circuit breaker. This may be necessary for determining the contact pressure, or the extent of contact engagement, which is actually present within the breaker.

Additionally, in many instances, it is desirable to be able to determine the velocity of opening and closing travel of the circuit breaker, so as to determine whether the operating mechanism is operating correctly and effectively. Also, in the testing of prototype breakers, it is necessary to test for the velocity of the opening and closing travel of the movable contact structure. This is of importance in determining the overall speed of the circuit-breaker structure.

SUMMARY OF THE INVENTION

It is desirable to be able to combine several of the aforesaid functions into a single device, which may be readily adapted for the various functions, and be simply attached into place. The present invention is particularly concerned with a simple device, which is capable of adaptation to a number of different functions, namely semaphore indication, hand-jack operation, and, when desired, velocity-travel indication for the opening and closing movements.

Accordingly, it is a general object of the present invention to provide an improved simplified device, which is capable of quick change from one of the aforesaid functions to the other.

Still another object of the present invention is the provision of an improved device capable of semaphore indication, hand-jack operation and velocity-travel indications, which is inexpensive and capable of quick changeover from one function to another.

Still a further object of the present invention is the provision of an improved semaphore device, which is compact, inexpensive and adaptable to a variety of functions, including hand-jack operation, and, when desired, travel indication.

In accordance with a preferred embodiment of the present invention, there is provided an indicator rod extending upwardly from the pneumatic operating piston, and capable of having a semaphore secured thereto, so as to be visible to one at ground level as to the operating position of the circuit breaker. The aforesaid indicating rod may have the semaphore removed therefrom and a manually operable hand-jack secured thereto to slowly effect opening and closing operations of the interrupter during maintenance. Thirdly, for determining the velocity of opening and closing movements of the operating mechanism, a solar-cell arrangement may be utilized to positively determine the velocity of opening and closing travel of the interrupter.

Further objects and advantages will readily become apparent upon reading the following specification taken in conjunction with the drawings.

DESCRIPTION OF THE PREFERRED EMBODIMENTS

Figure 1:
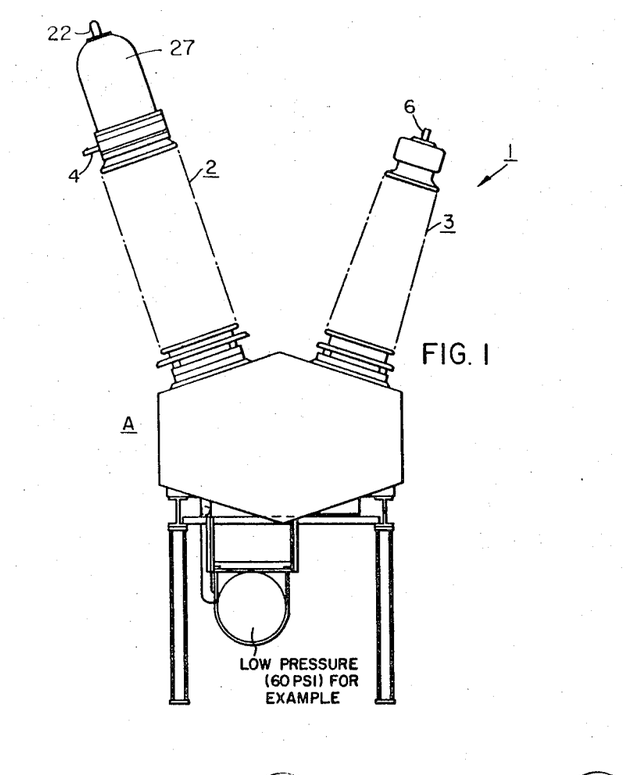
FIG. 1 is an end elevational view of a three-phase circuit interrupter embodying the principles of the present invention.
Figure 2:
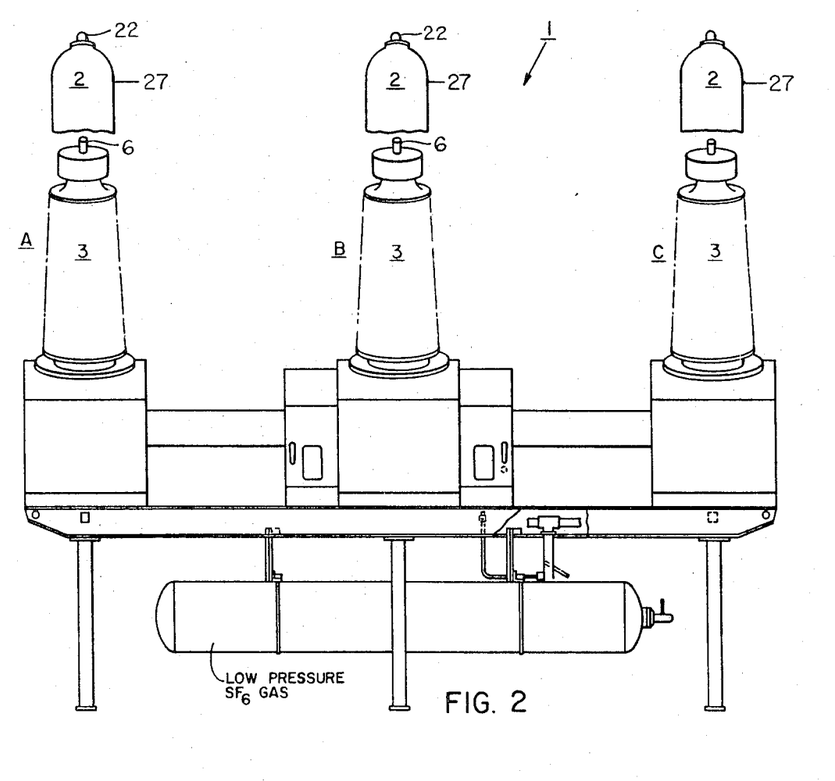
FIG. 2 is a side elevational view of the circuit-breaker structure of FIG. 1.
Figure 3:
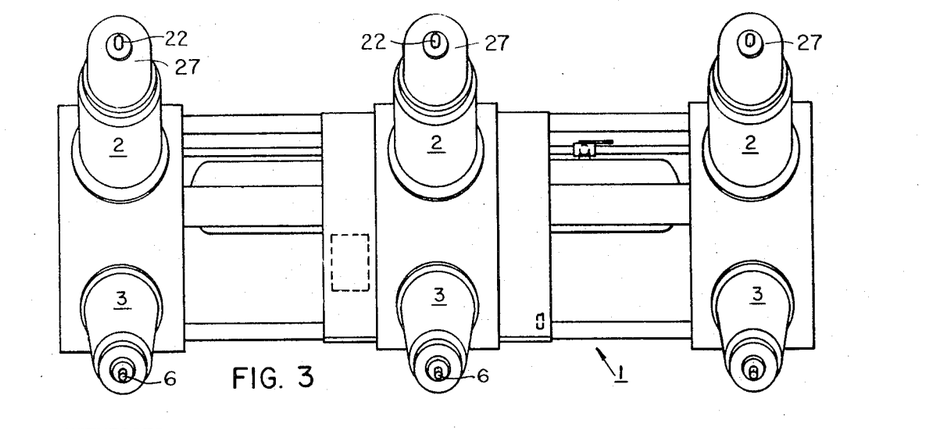
FIG. 3 is a top plan view of the circuit-breaker structure of FIGS. 1 and 2.

Referring to the drawings, and more particularly to FIGS. 1–3 thereof, the reference numeral 1 generally designates a three-phase circuit-interrupter construction. As more clearly illustrated in FIGS. 2 and 3 of the drawings, there are three pole-units "A," "B" and "C" provided for controlling the three phases of the associated transmission line.

As will be apparent from an inspection of FIG. 1, generally the circuit-breaker structure 1 comprises an interrupting column 2, extending slantingly upwardly toward the left, as viewed in FIG. 1, and having associated therewith a terminal-bushing structure 3 slanting upwardly toward the right. The circuit extends in a generally U-shape from the top terminal 4 of the interrupting column 2 through a "U" bend, not shown, disposed interiorly within a grounded operating housing, and by way of a terminal stud through the interior of the right-hand terminal bushing strucutre 3 to terminate at the right-hand terminal 6 of the interrupter 1. The particular constructional details of the aforesaid arrangement are set forth and described in U.S. Patent application filed Dec. 9, 1968, Ser. No. 782,365 by Richard E. Kane and Frank L. Reese now U.S. Pat. No. 3,596,028, and assigned to the assignee of the instant application. The disclosure of this patent application is incorporated herein by reference.

Figure 4:
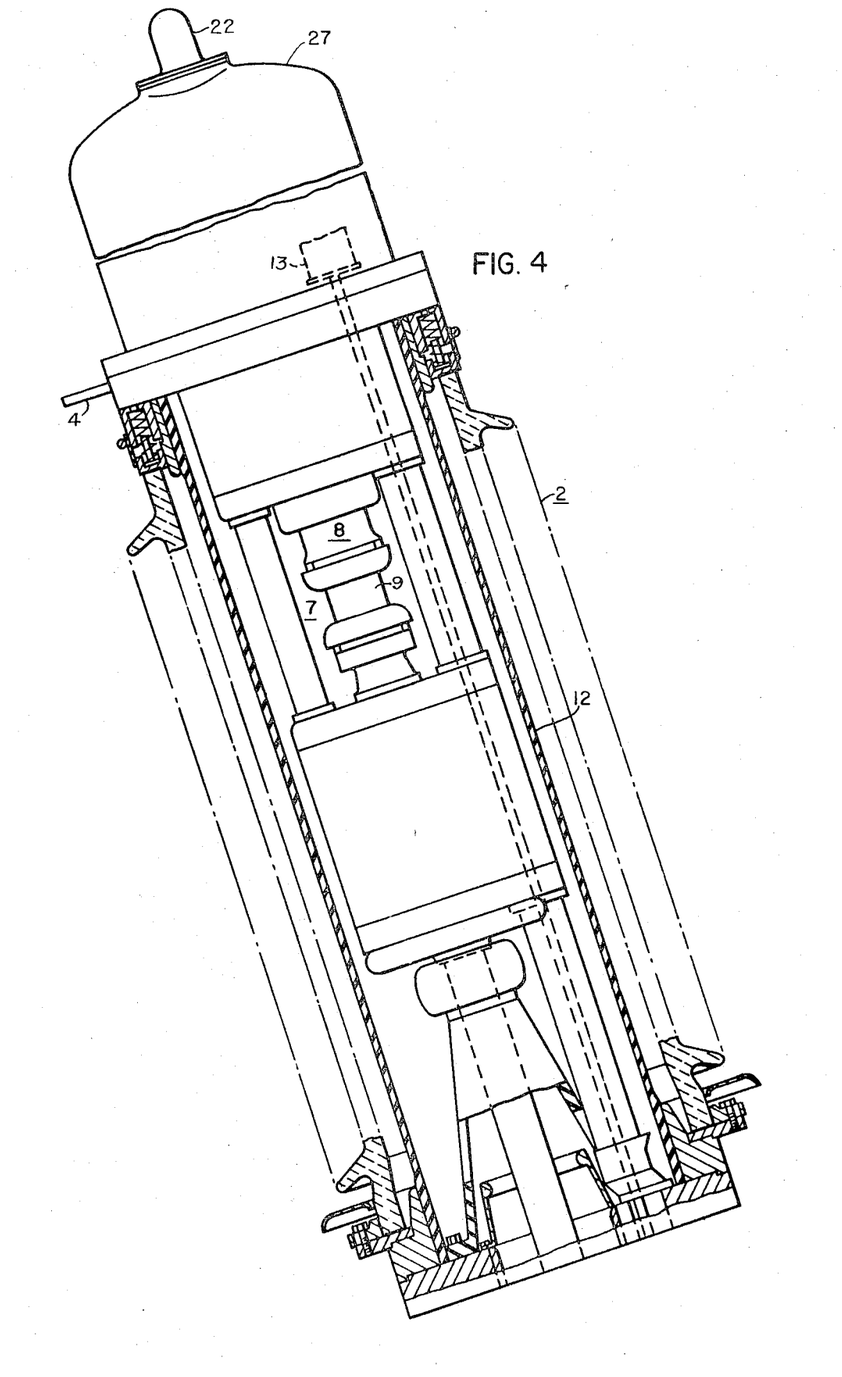
FIG. 4 is a partially vertical sectional view taken through the interrupting structure of the circuit interrupter of FIGS. 1-3, and illustrating generally the arc-extinguishing unit associated with the circuit-breaker structure.
Figure 5:
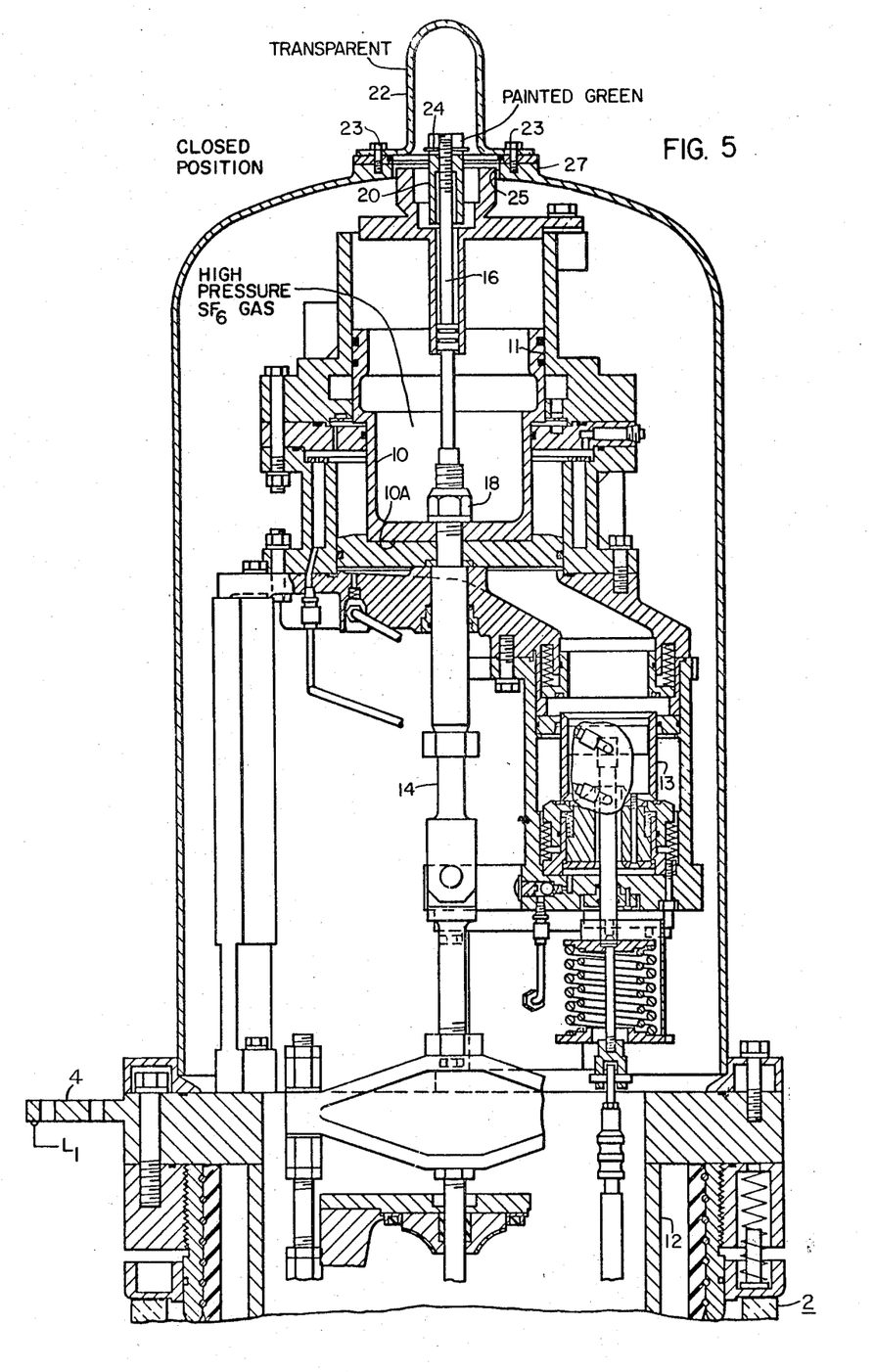
FIG. 5 is an enlarged vertical sectional view taken through the upper end of the interrupting column of FIG. 4 illustrating the indicator rod of the present invention and its use as a semaphore indicator.

Reference may be directed to FIG. 4 of the drawings, illustrating a vertical sectional view taken through the interrupting structure 7 disposed within the left-hand interrupting column 2. As will be apparent, there is provided an arc-extinguishing unit 8 comprising a movable tubular contact 9 which is connected to a pneumatic piston 10 illustrated more clearly in FIG. 5 of the drawings. With reference to FIG. 5, it will be noted that the operating piston 10 moves within an operating cylinder 11 being controlled by the gas pressure below the lower face 10a thereof. The pneumatic operation of the operating piston 10 is set forth and described in U.S. Patent application filed Dec. 10, 1968, Ser. No. 782,631, now U.S. Pat. No. 3,639,713, and additionally assigned to the assignee of the instant application. A three-way control valve structure 13 is provided to control the pressure conditions existing below the lower face 10a of the operating piston 10. Upon the entrance of high pressure therebelow, the operating piston 10 will be caused to move upwardly, and thereby to effect an upward movement of the operating rod 14, and consequently an upward opening movement of the movable tubular contact 9, illustrated more clearly in FIG. 4 of the drawings.

The particular structure associated with the arc-extinghishing unit 8 is set forth and described in more detail in U.S. patent application filed Dec. 30, 1968, Ser. No. 787,658, now U.S. Pat. No. 3,665,133, and also assigned to the assignee of the instant application. For the purpose of understanding the present invention, however, it is only necessary to know that there is associated with the movable contact structure an upwardly extending indicator rod 16 which moves upwardly during the opening operation.

The indicator rod 16 is fixedly secured to the operating piston 10 by a locking nut 18, and has a semaphore 20 secured thereto, which is visible through a transparent cover 22. As shown, the semaphore 20 is threadedly secured to, and locked to the upper end of the indicating rod 16 by a keying pin 24. Thus, when the breaker 1 is in the upper, or open-circuit position, the semaphore 20 is visible through the transparent cover 22. When the breaker is in the closed-circuit position, correspondingly, the semaphore 20 is retracted downwardly, and is out of view from the transparent cover 22.

Figure 6:
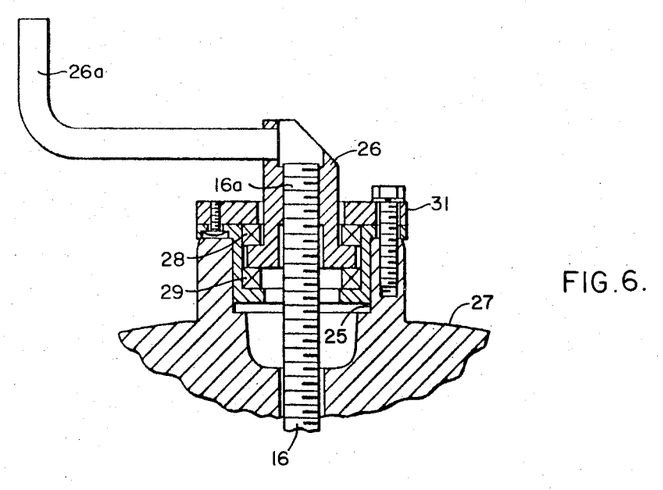
FIG. 6 is a fragmentary vertical sectional view taken along the indicator rod and paritally through the enclosing cap structure when adapted for hand-jack operation for slowly opening and closing the circuit breaker contact structure manually.
Figure 7:
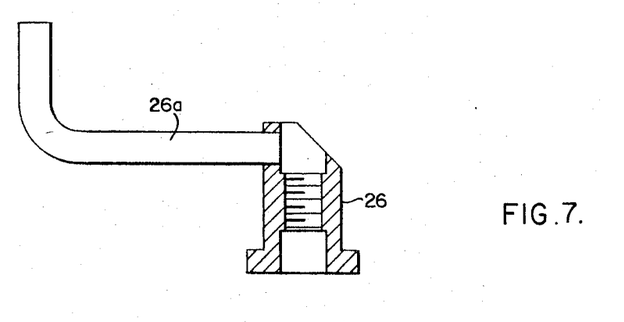
FIG. 7 is a side elevational view, partially in vertical section, of the hand-jack nut utilized in the maintenance operations, illustrated in FIG. 6 of the drawings.
Figure 8:
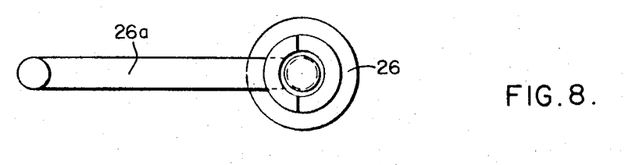
FIG. 8 is a top plan view of the hand-jack nut illustrated in FIG. 7.

For performing maintenance operations, as is more clearly illustrated in FIG. 6, the semaphore 20 is removed, and a manually operable nut 26 is secured to the upper end 16a of the threaded indicator rod 16. The nut 26 rotates in a stationary plane, as guided by thrust bearings 28, 29, which are mounted in place by a cover plate 31, more clearly illustrated in FIG. 6. The manually operable crank lever 26a is fixedly secured to the upper end of the nut 26 to avoid inadvertent dropping of a wrench, and the possibile injury to maintenance personnel. It will be apparent, upon an inspection of FIG. 6, that manual rotation of the crank-arm 26a effects rotation of the nut 26, and correspondingly upward or downward movement of the threaded indicator rod 16. This, of course, correspondingly effects upward or downward movement of the operating piston 10 and consequently the movable contact structure 9.

It is to be noted that an important advantage of the present invention is the fact that the maintenance man can operate the circuit breaker slowly with or without the sulfur hexafluoride ($SF_6$) gas within the interrupting casing 12.

Figure 9:
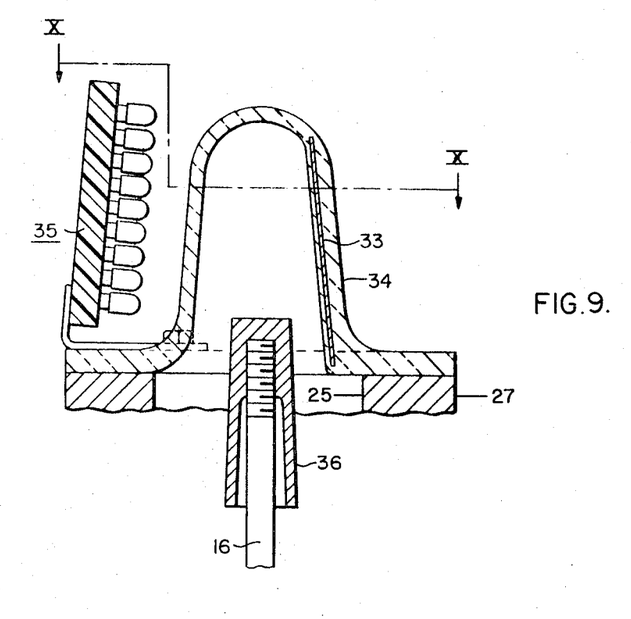
FIG. 9 is a vertical sectional view of the high-potential travel indicator with the circuit breaker being illustrated in the closed-circuit position.
Figure 10:
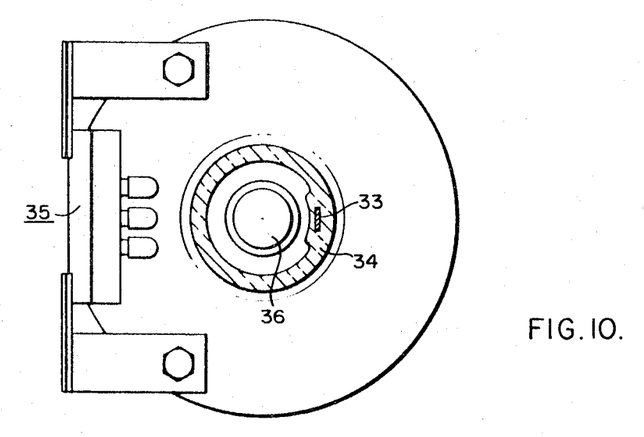
FIG. 10 is a sectional view taken substantially along the line X—X of FIG. 9.
Figure 14:
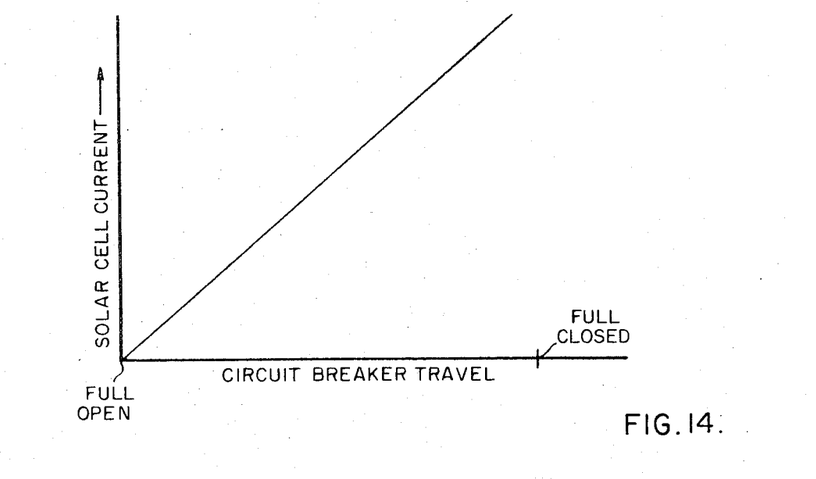
FIG. 14 is a graph of solar cell current output against position of the circuit breaker; and, FIGS. 15 and 16 are graphs of the opening and closing curves of a typical circuit breaker mechanism.

For travel indication, that is determining the velocity of opening and closing operations of the movable contact structure 9, an arrangement, as set forth in FIGS. 9 and 10, is utilized. It will be observed that a solar cell 33 is attached to the inside of the transparent cover 34. A light source 35 is attached to the cover flange, and the semaphore indicator 36 casts a shadow on the solar cell 33 as it moves to the open position reducing the light striking the solar cell 33. The current generated in the solar cell 33 by the light is a linear function of the circuit-breaker travel as shown in FIG. 14. The light source shown is a bank of flashlight lamps, but other light sources could be used, if desired. A cover could be placed over this assembly should sunlight be a factor. It is to be noted that no mechanical disassembly is required. As is obvious, a simple battery could be used as the energy source for the lamps.

Figure 11:
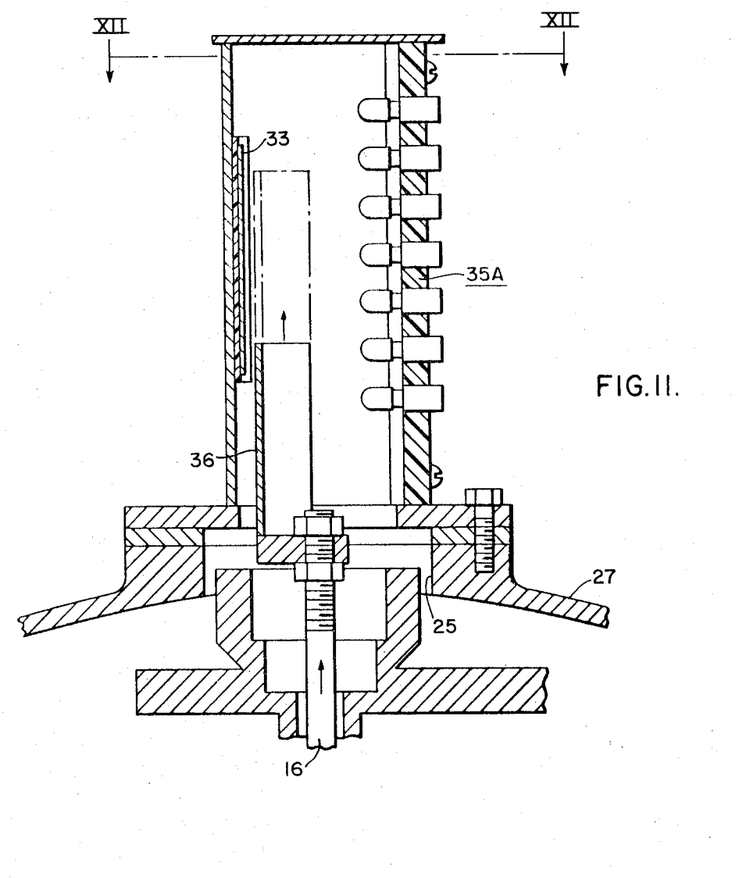
FIG. 11 is a vertical sectional view taken through a modified-type of velocity-travel indicator.
Figure 12:
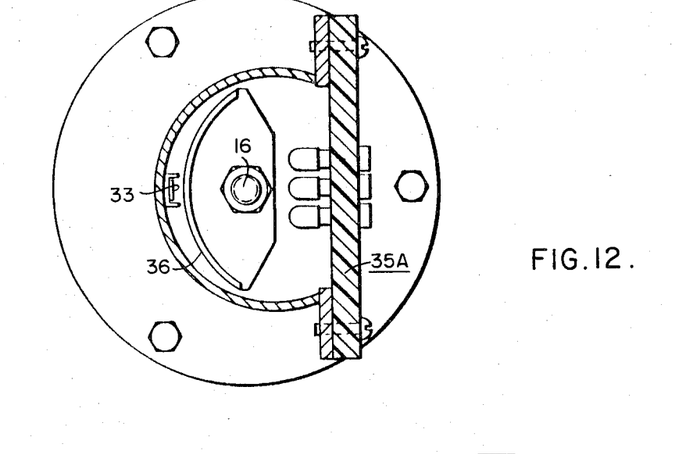
FIG. 12 is a top plan view of the travel indicator illustrated in FIG. 11.

FIGS. 11 and 12 illustrate an alternate solar-cell travel indicator. The transparent cover and the semaphore indicators 20 and 22 of FIG. 5 are removed, and a batter of lights 35A are used. The entire device functions much the same as the arrangement illustrated in FIGS. 9 and 10.

Figure 13:
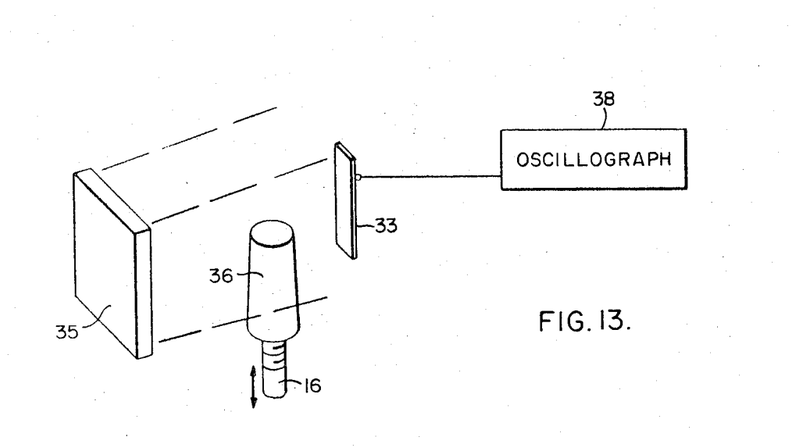
FIG. 13 is a block diagram of the circuitry involved in the travel indicator equipment.

FIG. 13 illustrates in diagrammatic and block form the basic elements of the solar-cell travel indicator. Generally speaking, they comprise the light source 35, the moving shade 36, the solar cell 33 and the oscillograph 38. The light source 35 emits a uniform light field directed towards the solar cell 33. The solar cell 33 converts light energy to electrical energy. The current from the solar cell 33 is fed to an oscillograph 38, from which a permanent record is obtained, such as on film, paper, etc.

The amount of current generated in the solar cell 33 is proportional to the amount of light striking its surface. The amount of light hitting the solar cell 33 is controlled by the position of the shade 36, which is mechanically connected to the circuit breaker moving contact. Therefore, the travel of the breaker contacts is directly proportional to the output of the oscillograph 38.

Figure 15:
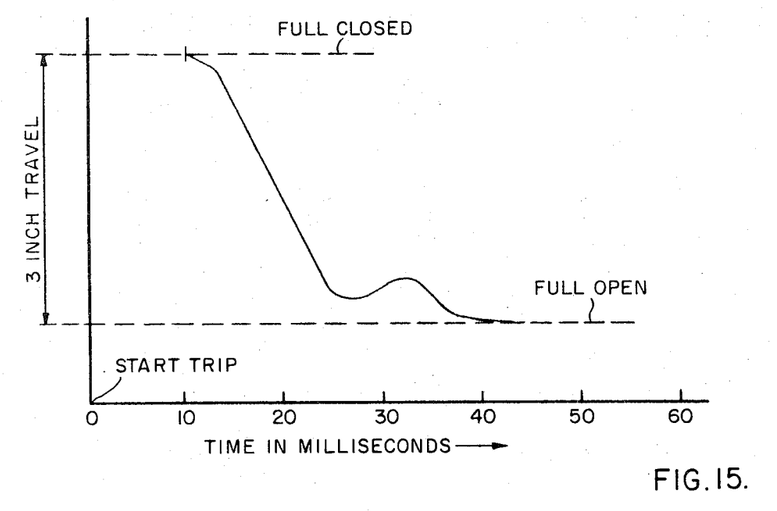

FIG. 14 illustrates a graph of solar-cell current output, against the position of the circuit breaker contacts; and FIG. 15 shows the record of circuit-breaker travel against time. This is the output of the oscillograph 38. The curve represented is that of circuit-breaker opening travel.

Figure 16:
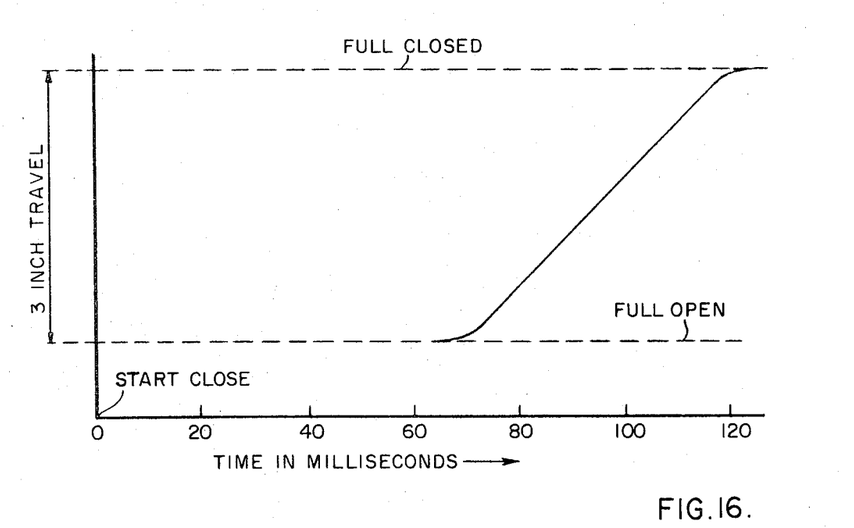

FIG. 16 illustrates an oscillograph record of the circuit-breaker closing travel.

From the foregoing description, it will be apparent that there has been provided a novel combined semaphore indicator, maintenance operator and travel indicator in one unitary device, which may be quickly and readily changed from one function over to another.

Although there have been illustrated and described specific structures, it is to be clearly understood that the same were merely for the purpose of illustration, and that changes and modifications may readily be made therein, by those skilled in the art, without departing from the spirit and scope of the invention.

We claim:
1. A circuit breaker comprising, in combination:
 a. a movable contact cooperable with a stationary contact to establish an arc and open the connected circuit;
 b. an indicator-rod responsive to movement of the movable contact in its opening and closing movements;
 c. a semaphore secured to the indicator-rod to indicate visibly the open and closed-circuit positions of the circuit breaker;
 d. said indicator-rod including thread means whereby a manually operable hand-jack threadedly related to said indicator-rod may be substituted for the semaphore indicator, said manually operable hand-jack causing the relatively slow opening and closing movement of said circuit breaker.

2. The combination of claim 1, wherein a shade is attached to the indicator-rod, a light source and solar cell are provided, whereby variable light illumination striking the solar cell by virtue of movement of the movable shade affixed to the indicator-rod will, through oscillographic means, give an indication of contact opening and closing velocity travel.

3. The combination of claim 1, wherein the hand-jack has a flange portion, and stationary thrust bearings guide the rotative motive of the flange portion of the rotatable hand-jack.

4. The combination of claim 1, wherein a transparent cover protects the movable semaphore and permits it to be observed visually.

* * * * *